United States Patent [19]

Carr

[11] Patent Number: 4,568,042
[45] Date of Patent: Feb. 4, 1986

[54] INTERNAL WING AIRCRAFT

[76] Inventor: Robert J. Carr, P.O. Box 2012, Oklahoma City, Okla. 73101

[21] Appl. No.: 356,314

[22] Filed: Mar. 9, 1982

[51] Int. Cl.⁴ .............................................. B64C 39/00
[52] U.S. Cl. ..................................... 244/13; 244/12.1; 244/36
[58] Field of Search ................. 244/13, 15, 12.1, 12.5, 244/23 R, 52, 230, 53 R, 53 B, 207, 34 R, 34 A, 36, 219

[56] References Cited

U.S. PATENT DOCUMENTS

| | | | |
|---|---|---|---|
| 2,380,535 | 7/1945 | McDevitt | 244/12.1 |
| 2,553,443 | 5/1951 | Davis | 244/12.1 |
| 2,928,238 | 3/1960 | Hawkins | 244/52 |
| 3,053,477 | 9/1962 | Reiniger | 244/53 B |
| 3,154,267 | 10/1964 | Grant | 244/207 |
| 3,596,852 | 8/1971 | Wakefield | 244/53 B |
| 3,785,593 | 1/1974 | Von Ohain et al. | 244/12.1 |
| 4,296,900 | 10/1981 | Krall | 244/207 |

FOREIGN PATENT DOCUMENTS

| | | |
|---|---|---|
| 1155513 | 5/1958 | France . |
| 1175936 | 4/1959 | France . |
| 418844 | 2/1967 | Switzerland . |

*Primary Examiner*—Galen L. Barefoot
*Attorney, Agent, or Firm*—Head, Johnson & Stevenson

[57] ABSTRACT

Lift for an aircraft is provided by forming a longitudinal lifting duct therethrough, said lifting duct having a substantially planar roof and a longitudinally cambered floor. When the aircraft is driven forwardly, a stream of air enters and passes through the lifting duct and the contouring of the floor of the lifting duct give rise to a pressure gradient in the air stream which result in a higher pressure on the roof of the lifting duct than on the floor thereof so that the pressure difference provides lift for the aircraft.

8 Claims, 8 Drawing Figures

INTERNAL WING AIRCRAFT

This application is a substitute application for my earlier related application Ser. No. 092,349, filed Nov. 8, 1979, now abandoned.

The present invention relates generally to aircraft, and, more particularly, but not by way of limitation, to means for providing lift for aircraft.

It is common knowledge that air pressure at a point on the surface of a moving object is a function of the velocity with which air streams over the surface at that point. Indeed, this principle is the basis for aircraft design; that is, it is common practice to shape the wings of an aircraft so that the velocity of air streaming over the top surface of each wing is greater than the velocity of air streaming over the bottom surface of the wing. This velocity differential, achieved by the contour of the wing, results in a pressure differential across the wing so that a net force, lift, is exerted on the wing to support the aircraft in flight.

The present invention exploits this principle in a novel manner to similarly achieve lift for an aircraft. In particular, the present invention contemplates the establishment of a pressure gradient in air streaming through a duct formed through the fuselage of an aircraft to provide lift for the aircraft. The pressure gradient increases from the floor of the duct to the roof thereof so that a larger force is exerted on the roof of the duct than on the floor thereof and the lift on the aircraft is the difference in these two forces. To this end, the duct extends longitudinally through the fuselage so that, as the aircraft is driven forwardly through the air, air enters and streams through the duct. The pressure gradient is then achieved by forming portions of the fuselage defining the roof of the duct such that the roof is substantially planar from the forward end of the aircraft to the rear end thereof and by forming portions of the fuselage defining the floor of the duct such that the floor is cambered along the longitudinal extent thereof. This camber of the floor of the duct results in a higher air stream velocity near the floor of the duct than near the roof of the duct to establish the desired pressure gradient.

The use of a duct through the fuselage of an aircraft, rather than a wing mounted externally of the fuselage, results in a number of benefits. A lifting duct will generally result in a more compact aircraft than can be constructed using external wings and the use of a duct offers flexibility in the design of aircraft to meet varying purposes. Since the shape of the exterior of an aircraft having a lifting duct can remain fixed while the profile of the duct is changed, such change can be used to vary the performance characteristics of the aircraft so that the aircraft designer is given a design variation capability that will generally not be available where external wings are used to lift the aircraft. That is, changes in performance can be accomplished by shaping structural members which provide the longitudinal camber of the floor and the effect of such shaping can be determined independently of other factors involved in the overall interaction of the aircraft with the air through which the aircraft will move. Moreover, since the floor of the duct is within the fuselage, an aircraft constructed in accordance with the present invention offers the capability of providing mechanisms for shaping the floor in flight without affecting the structural integrity of the aircraft as might be the case were shaping attempted in a wing extending in cantilever fashion from the fuselage. In addition, the formation of lifting surfaces within a duct permits a direct utilization for lifting purposes of air streams produced by engines and normally used to propel an aircraft so as to provide lift via the forward motion of the aircraft through the air. With lifting surfaces formed in a duct, such streams can be diverted into the duct to pass therethrough and provide lift so that the aircraft can be flown at lower speeds than would generally be the case for comparable aircraft having external wings.

An object of the present invention is to provide an aircraft which utilizes air streaming through a duct to provide lift.

Another object of the present invention is to enable compactness of aircraft design.

Yet a further object of the present invention is to provide an enhanced flexibility in aircraft design.

Still another object of the present invention is to provide an aircraft with a low flight speed capability.

Another object of the present invention is to provide variable flight characteristics in an aircraft.

Other objects, advantages and features of the present invention will become clear from the following detailed description of the preferred embodiments of the invention when read in conjunction with the drawings and appended claims.

Figure 1:
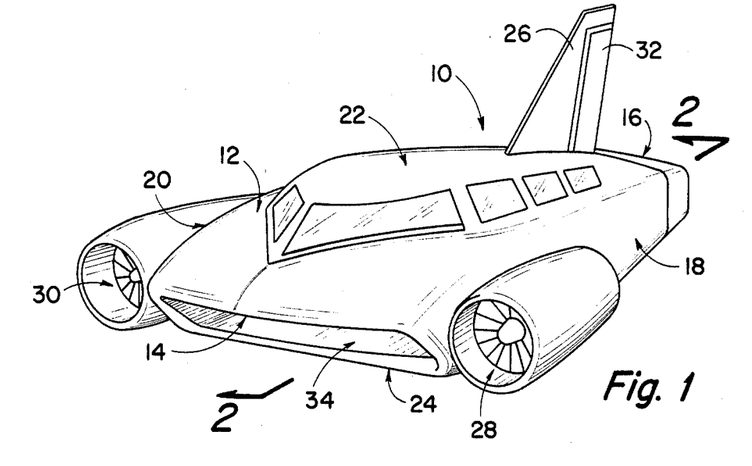
FIG. 1 is a perspective view of an aircraft constructed in accordance with the present invention.
Figure 2:
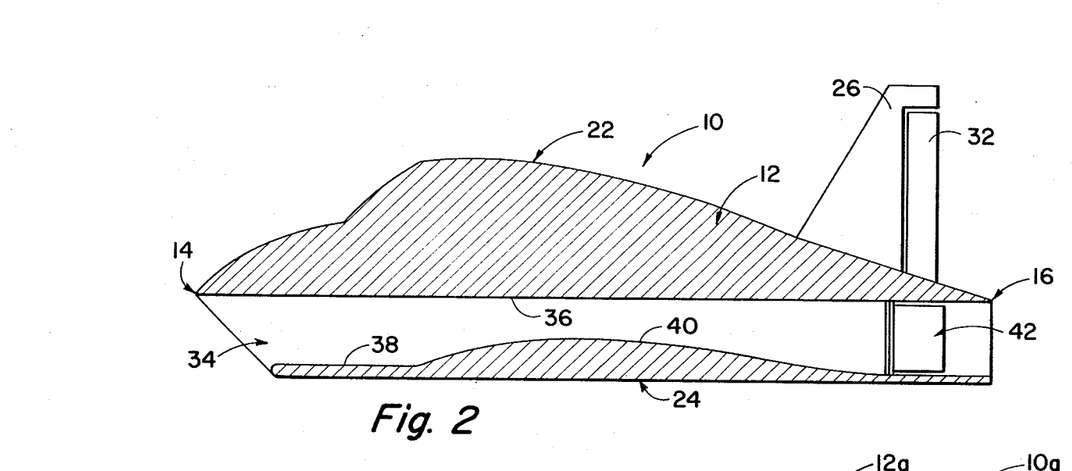
FIG. 2 is a schematic cross-section taken along line 2—2 of FIG. 1.
Figure 3:
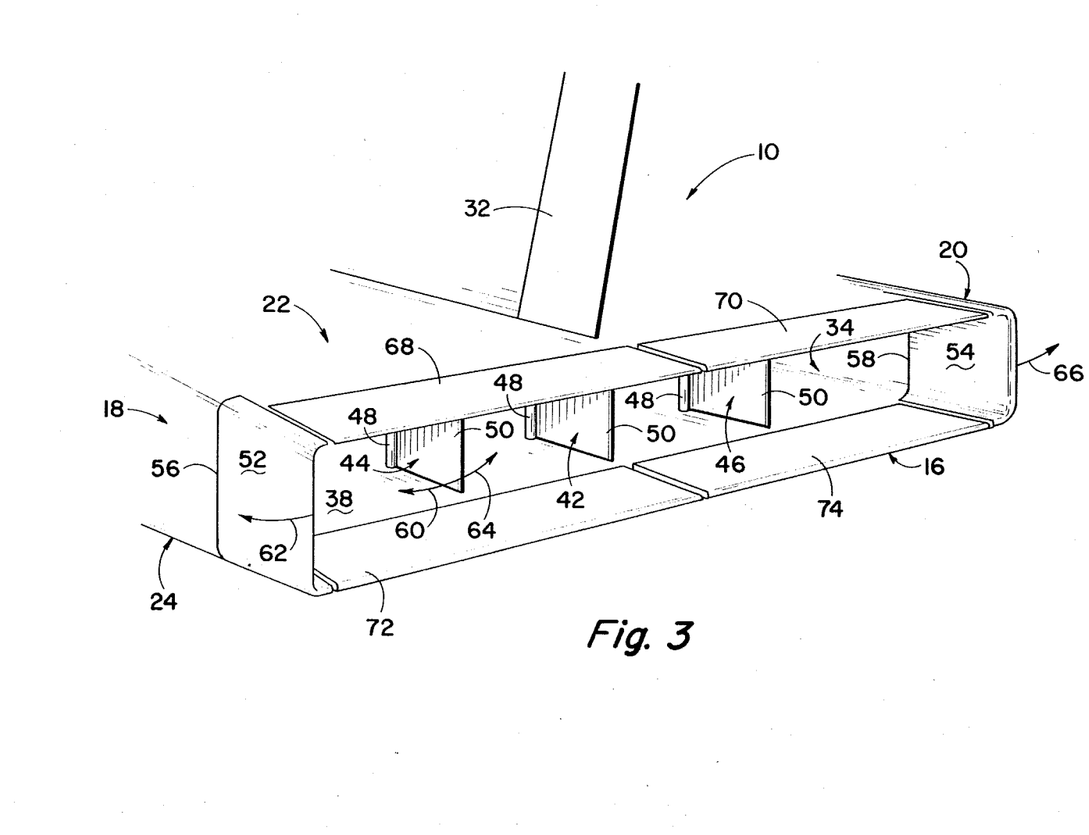
FIG. 3 is a fragmentary perspective view of the aircraft of FIG. 1 showing rear portions of the aircraft.

DESCRIPTION OF FIGS. 1 THROUGH 3

Referring now to the drawings in general and to FIGS. 1, 2 and 3 in particular, shown therein and designated by the general reference numeral 10 is one preferred embodiment of an aircraft constructed in accordance with the present invention. In general, the aircraft 10 comprises a fuselage 12 having: a forward end 14; a rear end 16; a first side 18; a second side 20; a top 22; and a bottom 24; the terms top and bottom being used herein to denote generally uppermost and lowermost surfaces of the aircraft 10 at such times that the aircraft 10 is in level flight. The aircraft 10 further comprises: a vertical stabilizer 26 mounted on the top 22 of the fuselage 12 near the rear end 16 thereof and extending vertically therefrom at such times that the aircraft 10 is in level flight; a first engine 28 mounted on the first side 18 of the fuselage 12 near the forward end 14 thereof; and a second engine 30 mounted on the second side 20 of the fuselage 12 near the forward end 14 thereof. For purposes of illustration, the engines 28 and 30 have been drawn as jet engines. However, the present invention is not limited to aircraft having such propulsive means; rather, any type of engine that produces a rearward air stream so as to provide thrust for the aircraft 10 can be used to propel the aircraft 10 without departing from the scope and spirit of the present invention. The stabilizer 12 can have an integral, external rudder 32 as has been shown in the drawings and, when such is the case, conventional control mechanisms (not shown) are provided for pivoting the rudder 32 for guidance purposes. The aircraft 10 further comprises conventional landing gear (not shown).

Lift for the aircraft 10 is provided by a lifting duct 34 which intersects the forward and rear ends, 14 and 16 respectively, of the fuselage 12 and extends longitudinally through the fuselage 12 between the ends 14 and 16 thereof. As has been indicated in FIGS. 1 and 3, the duct 34 has a generally rectangular transverse cross-section and FIG. 2 has been provided to show the longitudinal cross-section of the duct 34. (The fuselage 12, including portions thereof defining the duct 34, is constructed using conventional air frame construction methods so that a detailed discussion of the construction of the air frame need not be given for purposes of the present disclosure. Accordingly, conventional framing members, such as spars, stringers and the like, have not been shown in the drawings in the interest of clarity of description. Rather, where conventional framing methods would be employed in constructing portions of the aircraft 10, hatching has been used in drawings of cross-sections to indicate the use of such conventional methods.) As is indicated by a comparison of FIGS. 1 and 2, the duct 34 has a roof 36 which is substantially planar in form and which is oriented relative to the top 22 and bottom 24 of the fuselage 12 so as to be disposed substantially horizontally at such times that the aircraft 10 is in level flight. The floor 38 of the duct 34, on the other hand, has a central portion 40 which arches upwardly toward the roof 36 of the duct 34. That is, the floor 38 of the duct 34 is provided with a camber along the longitudinal extent thereof. This camber in the floor 38 of the duct 34 provides lift for the aircraft 10 as will be described below.

The aircraft 10 is provided with a plurality of internal rudders disposed within the duct 34 near the rear end 16 of the fuselage 12 and one of these rudders, designated 42, is shown in FIG. 2. The remaining rudders, designated 44 and 46, have been shown in FIG. 3 to which attention is now directed. As shown in FIG. 3, each of the rudders 42-46 has a forward, rod-shaped portion 48 and the upper and lower ends of the portions 48 extend into apertures (not shown) formed in the roof 36 and floor 38 of the lifting duct 34. As in the case of the external rudder 32, conventional control mechanisms are provided for pivoting the rudders 42-46 about the rod-shaped portions 48 thereof. Fin portions 50 of the rudders 42-46 extend from the rod-shaped portions 48 thereof generally toward the rear end 16 of the fuselage 12 for guidance of the aircraft as will be discussed below.

As will be noted in FIG. 3, portions of the fuselage 12 adjacent the rear end 16 thereof are constructed separately from remaining portions of the fuselage 12 which extend to the forward end 14 thereof. Specifically, portions of the fuselage 12 which form the sides of the lifting duct 34 at the rear end 16 of the fuselage 12 are formed into a vertically extending flap 52, at the first side 18 of the fuselage 12, and another vertically extending flap 54, at the second side 20 of the fuselage 12. The flaps 52, 54 are pivotally connected to remaining portions of the fuselage 12 at the leading edges 56, 58 thereof via internal hinge members (not shown) and conventional control mechanisms are provided to pivot the flaps 52, 54 on remaining portions of the fuselage 12. Specifically, the control mechanisms interconnect the flaps 52 and 54 with the rudders 42-46 so that, each time the rudders 42-46 are pivoted in the direction designated 60 in FIG. 3 for rudder 44, flap 52 is pivoted laterally outwardly from the fuselage 12; that is, in the direction designated 62 in FIG. 3. Similarly, each time the rudders 42-46 are pivoted in the direction designated 64 in FIG. 3 for rudder 44, the flap 54 is pivoted laterally outwardly from the fuselage 12; that is, in the direction designated 66 in FIG. 3. Any conventional control mechanism can be used for concertedly pivoting the flaps 52, 54 and the rudders 42-46. For example, hydraulic actuating cylinders (not shown) connected to portions of the flaps 52, 54 near the leading edges 56, 58 thereof and connected to the rod-shaped portions 48 of the rudders 42-46 and a suitable hydraulic valve circuit can be used for this purpose.

Portions of the fuselage 12 forming the roof 36 of the lifting duct 34 at the rear end 16 of the fuselage 12 are formed into two transversely extending flaps 68, 70 and portions of the fuselage 12 forming the floor 38 of the lifting duct 34 are similarly formed into two transversely extending flaps 72, 74. The flaps 68-74 are pivotally connected to remaining portions of the fuselage 12 in the manner that the flaps 52, 54 are connected to such remaining portions of the fuselage 12 and a conventional control mechanism is provided for pivoting the flaps 68-74 for pitch and roll control of the aircraft 10. That is, the flaps 68-70 can be pivoted upwardly or downwardly as a unit to deflect air exiting the lifting duct 34 upwardly or downwardly so as to raise or lower the forward end 14 of the aircraft 10. Similarly, the flaps 68 and 70, near the first side 18 of the fuselage 12, can be pivoted upwardly (or downwardly) while the flaps 70 and 74, near the second side 20 of the fuselage 12, can be pivoted downwardly (or upwardly) so that, as will be discussed below the flaps 68-74 form ailerons for the aircraft 10.

OPERATION OF FIGS. 1, 2 AND 3

The aircraft 10 is operated in a manner similar to the operation of a conventional aircraft; that is, the engines 28, 30 project streams of air rearwardly to provide thrust which propels the aircraft 10 forwardly and lift for the aircraft 10 is provided by the motion of the aircraft 10 through the air. More particularly, as the aircraft 10 moves through the air, air will enter the lifting duct 34 at the forward end 14 of the fuselage 12 and stream therethrough so as to exit therefrom at the rear end 16 of the fuselage 12. As the air streams through the lifting duct 34, the contour of the cambered portion 40 of the floor 38 of the lifting duct 34 results in a higher stream velocity at the floor 38 of the lifting duct 34 than at the roof 36 thereof so that the air streaming through the lifting duct 34 exerts a higher pressure at the roof 36 than at the floor 38. Accordingly, a pressure gradient is established vertically across the lifting duct 34 and such pressure gradient results in a larger force being exerted on the roof 36 of the lifting duct 34 than is exerted on the floor 38 thereof by air streaming through the lifting duct 34. This difference in the net forces exerted on the roof 36 and floor 38 of the lifting duct 34 provide the requisite lift necessary to maintain the aircraft 10 in flight.

Should it be desired to turn the aircraft 10, the rudders 32 and 42–46 and the flaps 68–74 provide the aircraft 10 with the capability of making a banked turn in the manner of a conventional aircraft. In particular, should it be desired to turn the aircraft to the left, air streaming through the lifting duct 34 generally along the first side 18 of the fuselage 12 is deflected upwardly as it exits the duct 34 by pivoting the flaps 68 and 72 upwardly and air streaming through the duct 34 generally along the second side 20 of the fuselage 12 is deflected downwardly by pivoting the flaps 70 and 74 downwardly. The deflection of air generally upwardly as it leaves the duct 34 near the first side 18 of the fuselage 12 and the deflection of air downwardly as it leaves the duct 34 generally along the second side 20 of the fuselage 12 exerts a coupled about the longitudinal axis of the fuselage 12 in substantially the same manner that air deflected by the ailerons on the wings of a conventional aircraft give rise to a couple about the longitudinal axis of the fuselage of such conventional aircraft. The couple so provided about the longitudinal axis of the fuselage 12 lowers portions of the fuselage 12 adjacent the first side 18 thereof while raising portions of the fuselage 12 adjacent the second side 20 thereof. The rudders 32 and 42–46 are pivoted in the direction 60 shown in FIG. 3 to deflect air laterally of the first side 18 of the fuselage 12 of the aircraft 10 so as to pivot the forward portions of the aircraft 10 toward the left as seen by occupants of the aircraft 10. The concurrent pivotation of the flap 52 in the direction 62 as the rudders 32, 42–46 are pivoted in the direction 60 prevents interference with the diversion of air streaming from the lifting duct 34 laterally outwardly of the first side 18 of the fuselage 12 so that the pivotation of the flap 52 enhances the turning capability of the aircraft 10 via the internal rudders 42–46. A banking turn to the right can be made by pivoting the rudders 32, 42–46 and the flaps 68–74 in directions opposite to those utilized for making a turn to the left and the pivotation of the flap 54 in the direction 66 in such case has an effect similar to the effect of pivotation of the flap 52 at such times that a turn to the left is made.

Figure 4:
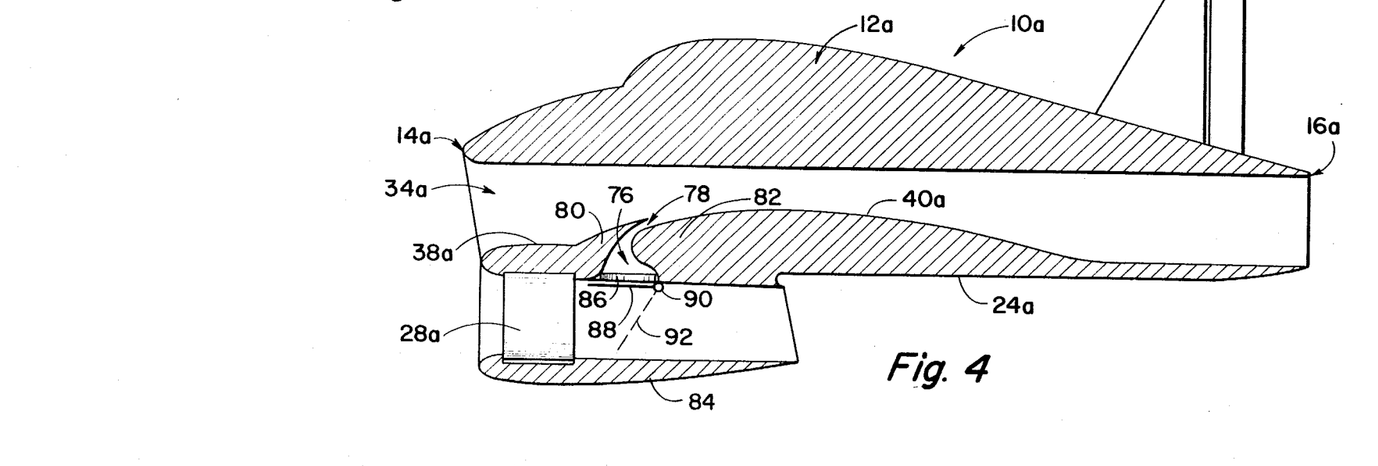
FIG. 4 is a schematic cross-section in side elevation of a second embodiment of an aircraft constructed in accordance with the present invention.

DESCRIPTION OF FIG. 4

Referring now to FIG. 4, shown therein and designated by the general reference numeral 10a is a schematic cross-section of a second embodiment of an aircraft constructed in accordance with the present invention. The aircraft 10a comprises a fuselage 12a having a lifting duct 34a and a stabilizer 16a similar to the stabilizer 16 of the aircraft 10. As in the aircraft 10, portions of the fuselage 12a near the rear end 16a thereof can be formed into flaps (not shown) which provide ailerons for the aircraft 10a and internal rudders (not shown) can be mounted in the lifting duct 34a as in the lifting duct 34 of the aircraft 10.

The aircraft 10a differs from the aircraft 10 in that the engines of the aircraft 10a can be utilized directly to provide lift for the aircraft 10a in addition to indirect utilization for such purpose wherein the engines drive the aircraft forwardly and the forward motion results in a stream of air passing through the lifting duct 34a. The direct lift capability is in part provided by forming a transverse duct 76 in portions of the channel 12a forming the floor 38a of the fuselage 12a so that the transverse duct 76 underlays the floor 38a of the lifting duct 34a near the forward end 14a of the fuselage 12a. The transverse duct 76 extends substantially the width of the lifting duct 34a and a slot 78, similarly extending substantially the width of the lifting duct 34a is formed in the floor 38a thereof to communicate the transverse duct 76 with the lifting duct 34a. The slot 78 is delimited by the arched portion 40a of the floor 38a of the duct 34a and a rearwardly sweeping overhang 80 which is disposed generally forward of the arched portion 40a and extends over a nose 82 formed at the forward end of the arched portion 40a of the floor 38a of the duct 34a so that air forced into the transverse duct 76, as will be discussed below, is projected rearwardly over the arched portion 40a of the floor 38a of the duct 34a by the slot 78 to provide lift for the aircraft 10a.

In order to more clearly show the manner in which the direct lift capability is provided, FIG. 4 has been drawn in contemplation of a single engine aircraft and such engine, shown schematically in FIG. 4 and designated 28a therein, is positioned, by way of example, on the bottom 24a of the fuselage 12a. (As will be clear from the description to follow, the aircraft 10a can be a multi-engine aircraft and the engines need not be positioned on the bottom of the aircraft for the provision of the direct lift capability.) The engine 28a is encased within a shroud 84 which underlays the transverse duct 76 and the transverse duct has an opening 86 into the shroud 84. In normal flight, wherein the aircraft 10a is operated, a cover 88 extends over the opening 86 so that an air stream is projected rearwardly by the engine 28a to produce thrust which propels the aircraft 10a. Such propulsion forces air through the lifting duct 34a to produce lift in the same manner that lift is produced in the aircraft 10. The cover 88 is pivotally attached, at the rear end 90 thereof, to the fuselage 12a and conventional positioning means; for example, a hydraulic actuating cylinder and suitable hydraulic circuitry, are provided for positioning the cover 88 over the opening 86 as has been shown in solid lines in FIG. 4 and, alternatively, for pivoting the cover 88 into the shroud 84 to the position shown in phantom lines in FIG. 4 and designated therein by the numeral 92. Thus, the cover 88 can be positioned so as to divert a portion of the air stream projected by the engine 28a into the transverse duct 76 so that such air stream is channeled by the slot 78 into a stream of air passing over the cambered portion 40a of the floor 38a of the duct 34a. (While the cover 88 has been drawn in FIG. 4 so that only a portion of the air stream projected by the engine 28a is diverted to the lifting duct 34a, it will be clear to those skilled in the art that the cover 88 and shroud 84 can be shaped to permit the diversion of the entirety of such air stream into the transverse duct 76 and, therefrom, into the lifting duct 34a.) Thus, the aircraft 10a can be placed in a high speed flight configuration, by positioning the cover 88 to overlay the opening 86, wherein the aircraft 10a is operated in the same manner that the aircraft 10 is operated and, alternatively, the aircraft 10a can be placed in a low speed configuration, by pivoting the cover 88 to the position designated by the numeral 92 in FIG. 4, wherein the air stream produced by the engine 28a is diverted from the shroud 84 into the transverse duct 76 and, therefrom, to the lifting duct 34a so that the engine 28a is used directly for providing lift for the aircraft 10a. The operation of the aircraft 10a in the high speed configuration thereof is substantially the same as the operation of the aircraft 10 and the provision of the low speed configuration permits a variation from the operation of the aircraft 10 wherein the aircraft 10a is flown at a lower speed than might be possible with the aircraft 10.

Figure 5:
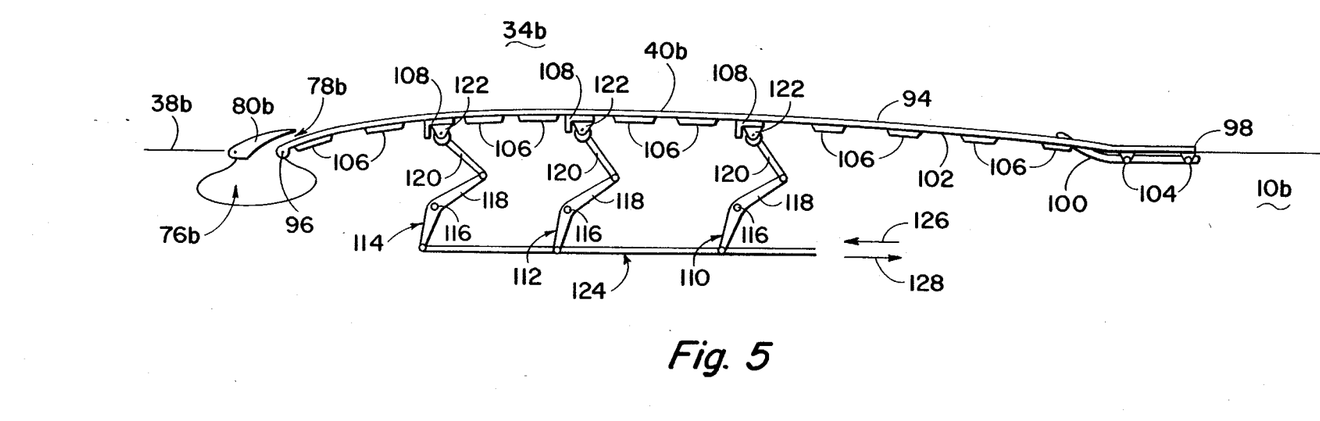
FIG. 5 is a fragmentary cross-section in side elevation of another embodiment of an aircraft constructed in accordance with the present invention.
Figure 6:
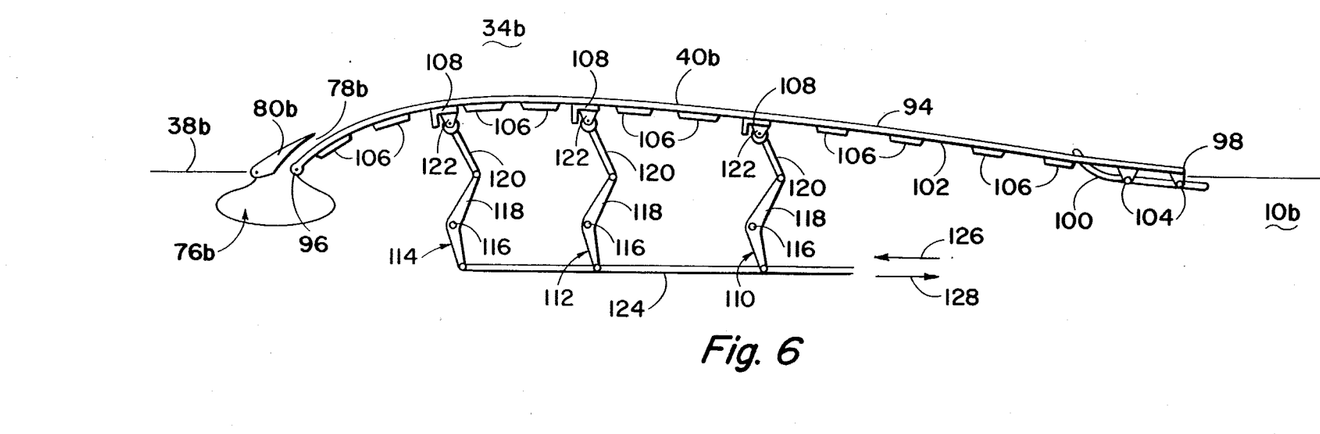
FIG. 6 is a fragmentary cross-section in side elevation similar to FIG. 5 but showing a different configuration of the lift duct floor.

DESCRIPTION OF FIGS. 5 AND 6

Referring now to FIGS. 5 and 6, shown therein is a schematic partial cross-section in side elevation of another embodiment of an aircraft, designated 10b in FIGS. 5 and 6, constructed in accordance with the present invention. Specifically, the portion of the aircraft 10b shown in FIGS. 5 and 6 includes the arched portion 40b of the floor 38b of the duct 34b. For purposes of example, it is contemplated that the aircraft 10b will be provided with a direct lift capability as in the aircraft 10a and portions of the fuselage (not numerically designated in FIGS. 5 and 6) which define the floor 38b and the transverse duct 76b have been indicated schematically in FIGS. 5 and 6. However, it will be clear from the discussion to follow that the aircraft 10b can be provided with only the indirect lift capability such as is the case with the aircraft 10.

The aircraft 10b is provided with a variable lift capability in that means are provided to vary the longitudinal camber of the floor 38b; that is, to provide a varying degree of arching of the arched portion 40b of the floor 38b of the duct 34b. To this end, the fuselage of the aircraft 10b comprises a sheet of metal 94 which forms the portion 40b of the floor 38b of the duct 34b. The sheet 94 is pivotally attached to remaining portions of the fuselage at the leading edge 96 thereof; that is, at the end thereof nearest the forward end of the fuselage of the aircraft 10b. The sheet 94 extends toward the rear end of the fuselage of the aircraft 10b and terminates at a trailing edge designated 98 in FIGS. 5 and 6. A plurality of guide rods 100 (one guide rod 100 has been shown in the drawings) are attached to the fuselage of the aircraft 10b adjacent the underside 102 of the sheet 94 and adjacent the trailing edge 98 thereof. The guide rods extend longitudinally of the fuselage of the aircraft 10b and a plurality of guide members 104 (only two guide members 104 are shown in the drawings) are mounted on the underside 102 of the sheet 94 so that two of the guide members 104 will slidingly engage each guide rod 100. Thus, the guide rods 100 and guide members 104 support the trailing edge 98 of the sheet 94 for longitudinal sliding movement in relation to remaining portions of the fuselage of aircraft 10b. (It will be noted that the guide rods 100 can be curved and portions thereof will, at times, extend through the sheet 94. Slots can be provided in the sheet 94 for this purpose. Such curvature is utilized to shape portions of the sheet 94 near the trailing edge 98 thereof as the camber of the floor 38b of the duct 34b is changed.)

A plurality of stiffening members, including members 106 which have the form of metal slats and members 108 which have an L-shaped cross-section are attached to the underside 102 of the sheet 94 and extend transversely to the duct 34b across the underside 102 of the sheet 94. The stiffening members 106, 108 provide the sheet 94 with sufficient rigidity to transmit lift produced thereby in conjunction with the roof (not shown) of the duct 34b to the fuselage of the aircraft 10b while, concurrently, permitting longitudinal flexure of the sheet 94. Such flexure is used to vary the camber of the floor 38b so that the aircraft 10b will have a variable lift capability. To this end, the aircraft 10b is provided with a plurality of stiffening member positioning assemblies and, by way of example, three stiffening member positioning assemblies have been shown in FIGS. 5 and 6 and designated 110, 112 and 114 therein. (As will be clear from the discussion to follow, the number of stiffening member positioning assemblies can be varied in accordance with particular applications wherein the variable lift capability of the aircraft 10b is utilized.) The stiffening member positioning assemblies 110, 112 and 114 are substantially identical; that is, the assemblies 110, 112 and 114 differ only in the dimensions of elements thereof, so that it will not be necessary for purposes of the present disclosure to describe each of the stiffening member positioning assemblies 110, 112 and 114 in detail. Rather, the stiffening member positioning assembly 110 will be described and reference numerals of elements of stiffening member positioning assemblies 112 and 114 will be identified in the drawings with the numerals used to identify substantially identical elements of the stiffening member positioning assembly 110.

The stiffening member positioning assembly 110 comprises a transverse shaft 116 which is secured by suitable bearings to the fuselage of the aircraft 10b so that the shaft 116 can be pivoted about an axis transverse to the longitudinal extent of the lifting duct 34b and parallel to the roof (not shown in FIGS. 5 and 6) thereof. A bell crank 118 is fixed to the shaft 116 to pivot therewith and a connecting rod 120 is pivotally connected to the upper end of the bell crank 118. The connecting rod 120 extends toward one of the L-shaped stiffening members 108 and is pivotally connected thereto via a suitable connector 122 mounted on the stiffening member 108. The lower end of the bell crank 118 of each stiffening member positioning assembly 110-114 is pivotally attached to a longitudinally extending push rod 124 and one end of the push rod 124 is connected to a suitable mechanism, such as a hydraulic actuating cylinder (not shown), for alternatively moving the push rod 124 in a direction 126 toward the forward end of the fuselage and in a direction 128 toward the rear end of the fuselage of the aircraft 10b.

FIGS. 5 and 6 have been drawn to show the manner in which the above described structure permits the camber of the floor 38b of the duct 34b to be varied. That is, FIG. 5 shows one position of the push rod 124 and FIG. 6 shows the affect on the configuration of the sheet 94 of moving the push rod 124 from the position shown therefor in FIG. 5 toward the rear end of the fuselage of the aircraft 10b; that is, in the direction 128. As a comparison of FIGS. 5 and 6 shows, such movement of the push rod 124 moves the upper ends of the bell cranks 118 upwardly; that is, toward the duct 34b so that the connecting rods 120 raise the stiffening members 108 toward the roof (not shown) of the duct 34b to provide a greater camber to the floor 38b of the duct 34b. (The support of the trailing edge 98 of the sheet 94 via the guide members 104 and guide rods 100 permits the trailing edge 98 to shift forward as the arched portion 40b of the floor 38b is raised into the duct 34b so that the camber of the floor 38b is changed by a flexure of the sheet 94.)

It will be noted that where the aircraft 10b is provided with a transverse duct 76b to include the direct lift capability, similar to that provided in the aircraft 10a, the overhang 80b, which serves the same purposes as the overhang 80 in the aircraft 10a is pivotally attached to the floor 38b forwardly of the transverse duct 76b. Such attachment permits the slot 78b to be maintained open despite changes in shape of the sheet 94 near the leading edge 98 thereof and, for this purpose, a conventional mechanical linkage (not shown) can be used to connect the overhang 80b to the push rod 124 to pivot the overhang toward and away from the sheet 94 as the configuration of the sheet 94 is varied by the movement of the push rod 124. Where the duct 76b is provided, the aircraft 10b is operated in substantially the same manner as is the aircraft 10a, such operation differing only in that the operator of the aircraft 10b is additionally provided with the capability of further increasing the lift provided by the direct lift capability via an increase in the camber of the floor 38b of the duct 34b. Where the duct 76b is not provided, the aircraft 10b is operated, in a manner similar to the operation of the aircraft 10, in either a high speed configuration or a low speed configuration. In the high speed configuration, the push rod 124 is moved to a position such as shown in FIG. 6 wherein the camber of the floor 38b of the duct 34b is relatively small for reduced drag and, in the low speed configuration, the push rod 124 is positioned as in FIG. 5 wherein the floor 38a has a larger camber for increased lift.

Figure 7:
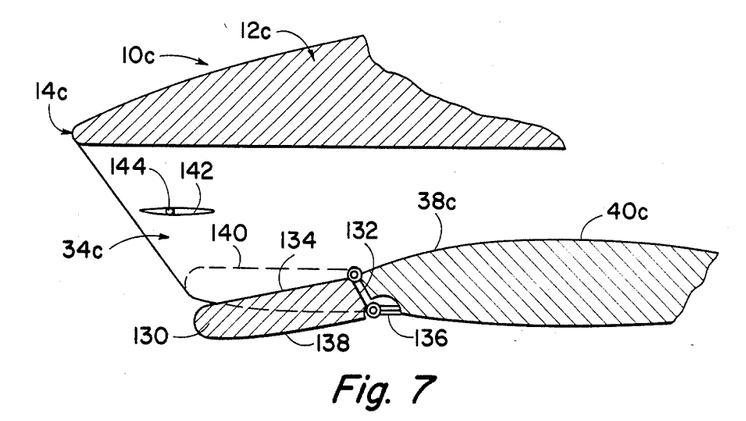
FIG. 7 is a fragmentary, schematic cross-section in side elevation of another embodiment of an aircraft constructed in accordance with the present invention.

DESCRIPTION OF FIG. 7

Referring now to FIG. 7, shown therein is a partial schematic cross-section in side elevation of another embodiment of an aircraft, designated 10c, constructed in accordance with the present invention. As does the aircraft 10b, the aircraft 10c exploits the capability of an aircraft having a lifting duct, rather than external wings, to maintain structural integrity despite the provision of mechanisms to reposition portions of the floor of the lifting duct for various purposes. In particular, in the aircraft 10c, the fuselage 12c comprises a flap 130 which forms a portion of the floor 38c of the duct 34c adjacent the forward end 14c of the fuselage 10c. The trailing side 132 of the flap 130; that is, the side thereof nearest the rear end (not shown in FIG. 7) of the fuselage 12c, is pivotally connected adjacent the upper surface 134 of the flap 130 to remaining portions of the fuselage 12c and a push rod 136 is pivotally connected to the trailing side 132 of the flap 130 adjacent the lower surface 138 thereof. As in the case of the push rod 124 of the aircraft 10b, the push rod 136 is connected to a suitable means, such as a hydraulic actuating cylinder or the like (not shown), for moving the push rod 136 toward and away from the forward end 14c of the fuselage 12c. Thus, the flap 130 can be pivoted about an upper, rear edge thereof to the position shown by solid lines and hatching in FIG. 7 and to the position indicated in phantom lines and designated by the numeral 140 in FIG. 7.

The aircraft 10c further comprises an inlet vane 142 which is pivotally mounted within portions of the lifting duct 34c near the forward end 14c of the fuselage 12c via a shaft 144 which, in turn, is mounted via suitable bearings (not shown) mounted in the walls of the lifting duct 34c. The inlet vane 142 senses the angle of attack of the lifting duct 34c with respect to surrounding air and the aircraft 10c can be provided with conventional mechanisms (not shown) to display such information to the operator of the aircraft 10c or, alternatively, the aircraft 10c can be provided with mechanisms (not shown) for automatically controlling the position of the flap 130 so that the flap 130 can be moved toward the position shown in solid lines in FIG. 7 as the angle of attack of the lifting duct 34c increases. Such movement provides a decreased effective angle of attack for the lifting duct 34c.

The flap 130 can also provide an increased camber for the floor 38c of the lifting duct 34c by lowering portions thereof, formed by the flap 130, forwardly of the arched portion 40c of the floor 38c of the lifting duct 34c. When the flap 130 is used for this purpose, the aircraft 10c has, as do the aircraft 10c and 10b, both low speed and high speed configurations. In the high speed configuration, the flap 130 is raised to the position indicated at 140 in FIG. 7 and the aircraft 10c is operated in the same manner that the aircraft 10 is operated. In the low speed configuration, the flap 130 is lowered to produce, through the increased camber of the floor 38c of the duct 34c, a lift sufficient to support the aircraft 10c at low flight speeds.

Figure 8:
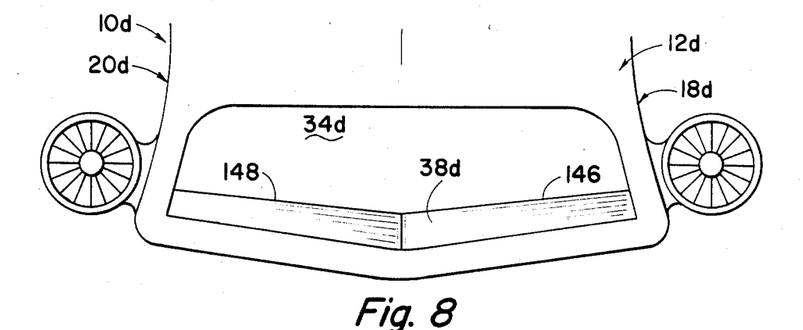
FIG. 8 is a fragmentary front elevational view of another embodiment of an aircraft constructed in accordance with the present invention.

DESCRIPTION OF FIG. 8

FIG. 8, wherein is shown a partial front elevational view of another embodiment of an aircraft, designated 10d, constructed in accordance with the present invention, has been included to show a modification of the aircraft 10. In the aircraft 10d, the floor 38d of the lifting duct 34d is formed into a first portion 144 extending generally from the center of the lifting duct 34a to the side thereof adjacent the first side 18d of the fuselage 12d and a second portion 146 extending between the portion 144 and the side of the lifting duct 34d adjacent the second side 20d of the fuselage 12d. As shown in FIG. 8, the portions 144 and 146 meet in a positive dihedral which, in some cases, can add to the stability of the aircraft 10d. The aircraft 10d is operated in the same manner as the aircraft 10.

It is clear that the present invention is well adapted to carry out the objects and obtain the ends and advantages mentioned as well as those inherent therein. While presently preferred embodiments of the invention have been described for purposes of this disclosure, numerous changes may be made which will readily suggest themselves to those skilled in the art and which are encompassed within the spirit of the invention disclosed and as defined in the appended claims.

What is claimed is:

1. In an externally wingless aircraft having a fuselage and means for providing lift for the aircraft, the improvement wherein an internally disposed lifting duct having an essentially unobstructed opening extending entirely therethrough is formed longitudinally through the fuselage, said lifting duct having a substantially planar roof extending entirely across the width thereof and a longitudinally cambered floor such that the lifting duct forms said means for providing lift for the aircraft and provide an internal wing therefor, wherein the fuselage has opposed forward and rear ends intersected by said duct such that the duct opens forwardly and rearwardly of the aircraft; and wherein the cambering of the floor of the duct is characterized as being formed by a single portion of the floor arching upwardly in a direction toward the roof of the duct beginning near the forward end of the fuselage and downwardly in a direction away from the roof and ending near the rear end of the fuselage.

2. The aircraft of claim 1 further comprising:
   propulsion means for forming a rearwardly directed air stream so as to propel the aircraft; and means for directing at least a portion of said air stream through the duct.

3. The aircraft of claim 2 wherein the means for directing at least a portion of said air stream through the duct comprises:

means forming a transverse duct in portions of the fuselage underlying the floor of the lifting duct near the forward end of the aircraft, and transverse duct communicating with the lifting duct via a transverse slot formed in the floor of the lifting duct and extending to the transverse duct; and means for diverting at least a portion of said air stream into the transverse duct.

4. The aircraft of claim 1 wherein the fuselage comprises a transverse flap forming a portion of the floor of the lifting duct adjacent the forward end of the aircraft, said flap pivotally connected at the side thereof nearest the rear end of the fuselage for pivotation about a transverse axis; and means for pivoting said flap.

5. The aircraft of claim 1 wherein the floor of said lifting duct has a first portion extending longitudinally along one side of the lifting duct and a second portion extending longitudinally along the opposite side of the lifting duct, the first and second portions of the floor of the lifting duct meeting at a positive dihedral at the center of the lifting duct.

6. The aircraft of claim 1 wherein portions of the fuselage forming the roof of the lifting duct at the rear end of the aircraft are formed into two transversely extending, pivotable flaps and portions of the fuselage forming the floor of the lifting duct at the rear end of the aircraft are formed into two transversely extending, pivotable flaps so as to provide pitch and roll control for the aircraft.

7. The aircraft of claim 1 further comprising a plurality of vertically extending internal rudders pivotally mounted within the lifting duct near the rear end of the aircraft.

8. The aircraft of claim 7 wherein portions of the fuselage forming sides of the lifting duct at the rear end of the fuselage are formed into vertically extending flaps pivotable about the leading edges thereof laterally outwardly from the fuselage.

* * * * *